United States Patent
Abdulkader et al.

(10) Patent No.: US 11,094,326 B2
(45) Date of Patent: Aug. 17, 2021

(54) ENSEMBLE MODELING OF AUTOMATIC SPEECH RECOGNITION OUTPUT

(71) Applicant: Cisco Technology, Inc., San Jose, CA (US)

(72) Inventors: Ahmad Abdulkader, Palo Alto, CA (US); Mohamed Gamal Mohamed Mahmoud, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/056,298

(22) Filed: Aug. 6, 2018

(65) Prior Publication Data

US 2020/0043496 A1 Feb. 6, 2020

(51) Int. Cl.
| | |
|---|---|
| *G06F 17/00* | (2019.01) |
| *G10L 15/26* | (2006.01) |
| *G10L 15/16* | (2006.01) |
| *G10L 15/32* | (2013.01) |
| *G06N 20/00* | (2019.01) |
| *G06N 20/20* | (2019.01) |

(52) U.S. Cl.
CPC .............. *G10L 15/26* (2013.01); *G06N 20/00* (2019.01); *G06N 20/20* (2019.01); *G10L 15/16* (2013.01); *G10L 15/32* (2013.01)

(58) Field of Classification Search
CPC ......... G10L 15/26; G10L 15/16; G10L 15/32; G06N 20/00; G06N 20/20
USPC ............................................ 704/231; 700/94
See application file for complete search history.

(56) References Cited

U.S. PATENT DOCUMENTS

| | | | | |
|---|---|---|---|---|
| 9,171,066 | B2* | 10/2015 | Hebert | G06F 16/3329 |
| 9,336,770 | B2* | 5/2016 | Tachioka | G10L 15/06 |
| 9,684,715 | B1* | 6/2017 | Ross | G06F 16/683 |
| 10,062,367 | B1* | 8/2018 | Evans | G10H 1/366 |
| 10,229,672 | B1* | 3/2019 | Rao | G10L 15/16 |
| 2005/0177376 | A1* | 8/2005 | Cooper | G10L 15/065 704/277 |
| 2009/0018833 | A1* | 1/2009 | Kozat | G10L 15/32 704/257 |
| 2010/0057450 | A1* | 3/2010 | Koll | G10L 15/32 704/231 |

(Continued)

OTHER PUBLICATIONS

Adaptive Mixture of Local Experts; Hinton (Year: 1991).*

(Continued)

*Primary Examiner* — Paul C McCord
(74) *Attorney, Agent, or Firm* — Merchant & Gould P.C.

(57) ABSTRACT

One embodiment of the present invention sets forth a technique for performing ensemble modeling of ASR output. The technique includes generating input to a machine learning model from snippets of voice activity in the recording and transcriptions produced by multiple automatic speech recognition (ASR) engines from the recording. The technique also includes applying the machine learning model to the input to select, based on transcriptions of the snippet produced by at least one contributor ASR engine of the multiple ASR engines and at least one selector ASR engine of the multiple ASR engines, a best transcription of the snippet from possible transcriptions of the snippet produced by the multiple ASR engines. The technique further includes storing the best transcription in association with the snippet.

19 Claims, 5 Drawing Sheets

(56) References Cited

U.S. PATENT DOCUMENTS

| | | | | |
|---|---|---|---|---|
| 2010/0121638 | A1* | 5/2010 | Pinson | G10L 15/02 704/235 |
| 2010/0191530 | A1* | 7/2010 | Nakano | G10L 15/005 704/244 |
| 2012/0179463 | A1* | 7/2012 | Newman | G10L 15/30 704/231 |
| 2012/0239613 | A1* | 9/2012 | Danciu | G06Q 10/06 707/603 |
| 2013/0238330 | A1* | 9/2013 | Casella dos Santos | G10L 15/183 704/235 |
| 2014/0136183 | A1* | 5/2014 | Hebert | G06F 17/2765 704/9 |
| 2014/0250523 | A1* | 9/2014 | Savvides | G06F 21/32 726/19 |
| 2015/0039306 | A1* | 2/2015 | Sidi | G10L 15/01 704/235 |
| 2016/0034811 | A1* | 2/2016 | Paulik | G06N 3/0454 706/20 |
| 2016/0078339 | A1* | 3/2016 | Li | G06N 3/084 706/20 |
| 2016/0358606 | A1* | 12/2016 | Ramprashad | G10L 15/32 |
| 2017/0103194 | A1* | 4/2017 | Wechsler | G06F 21/316 |
| 2017/0364806 | A1* | 12/2017 | Boyer | G06N 5/022 |
| 2018/0047387 | A1* | 2/2018 | Nir | G10L 15/02 |
| 2018/0165554 | A1* | 6/2018 | Zhang | G06K 9/6269 |
| 2019/0035385 | A1* | 1/2019 | Lawson | G10L 15/01 |

OTHER PUBLICATIONS

Rover: Post-Processing System To Yield Reduced Word Error Rates: Recognizer Output Voting Error Reduction (Year: 1997).*
Distributed Associative Memory for Scalable Pattern Recognition; Amir (Year: 2014).*
Dual Discriminator Generative Adversarial Nets: Nguyen (Year: 2017).*
Wong: Sequence Student-Teacher Training of Deep Neural Networks (Year: 2016).*
Khare: Artificial Speciation of Neural Network Ensembles (Year: 2002).*
Kim: Evolutionary ensemble of diverse artificial neural networks using speciation (Year: 2006).*
Kaggle Ensembling Guide (Year: 2015).*
Combining multiple surrogate models to accelerate failure probability estimation with expensive high-fidelity models (Year: 2017).*
Schmiedlechner, Towards Distributed Coevolutionary GAN (Year: 2018).*

* cited by examiner

ENSEMBLE MODELING OF AUTOMATIC SPEECH RECOGNITION OUTPUT

BACKGROUND

Field of the Various Embodiments

Embodiments of the present invention relate generally to text and speech analytics, and more particularly, to ensemble modeling of automatic speech recognition output.

Description of the Related Art

Recent technological advances have allowed meetings to be conducted more efficiently and effectively. For example, network-enabled devices have been deployed with solutions that allow people to conduct teleconferences with one another instead of requiring all participants to be in the same physical location. The solutions may also allow the participants to record video and/or audio during meetings, generate transcripts from meeting recordings, share notes and minutes with one another, find meeting times that work best for most or all participants, and/or interact or collaborate within a virtual or augmented environment.

However, individual automatic speech recognition (ASR) engines used to generate transcripts from meetings or other recordings can vary in performance under different conditions. For example, ASR engines may vary in their ability to recognize speech across different languages, vocabularies, accents, dialects, voices, speech patterns, and/or audio characteristics.

As the foregoing illustrates, what is needed is a technological improvement for improving the performance of ASR engines under varying conditions.

SUMMARY

One embodiment of the present invention sets forth a technique for performing ensemble modeling of ASR output. The technique includes generating input to a machine learning model from snippets of voice activity in the recording and transcriptions produced by multiple automatic speech recognition (ASR) engines from the recording. The technique also includes applying the machine learning model to the input to select, based on transcriptions of the snippet produced by at least one contributor ASR engine of the multiple ASR engines and at least one selector ASR engine of the multiple ASR engines, a best transcription of the snippet from possible transcriptions of the snippet produced by the multiple ASR engines. The technique further includes storing the best transcription in association with the snippet.

At least one advantage and technological improvement of the disclosed techniques is that transcription is performed more accurately than conventional techniques that select and/or use a single ASR engine to transcribe an entire recording, which cannot adapt to changing conditions within the recording and/or across different recordings. Consequently, the disclosed techniques provide technological improvements in the accuracy and/or performance of ASR engines, interactive virtual meeting assistants, and/or other applications or devices that are used to manage, review, and/or analyze recordings of meetings or other types of events.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
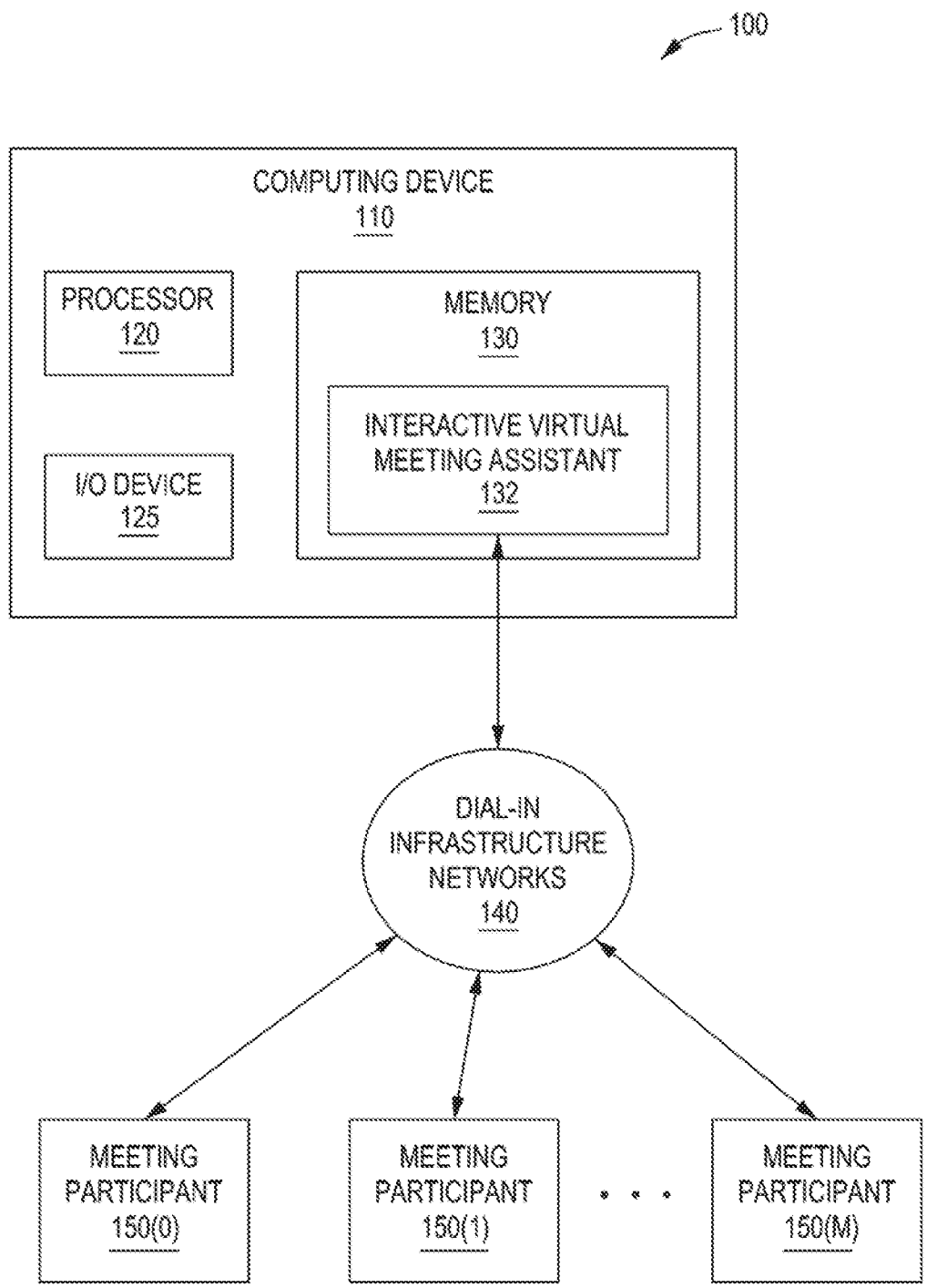
FIG. 1 is a block diagram illustrating a system configured to implement one or more aspects of the present disclosure.

FIG. 1 illustrates a system 100 configured to implement one or more aspects of the present disclosure. As shown, system 100 includes, without limitation, a computing device 110 coupled via dial-in infrastructure networks 140 to multiple meeting participants 150(0) to 150(m).

As shown, computing device 110 includes, without limitation, a processor 120, input/output (I/O) devices 125, and a memory 130. Processor 120 may be any technically feasible form of processing device configured to process data and execute program code. Processor 120 could be, for example, a central processing unit (CPU), a graphics processing unit (GPU), an application-specific integrated circuit (ASIC), a field-programmable gate array (FPGA), and so forth. I/O devices 125 may include devices configured to receive input or provide output, including, for example, a keyboard, a mouse, a display, and so forth.

Memory 130 may be any technically feasible storage medium configured to store data and software applications. Memory 130 may be, for example, a hard disk, a random-access memory (RAM) module, a read-only memory (ROM), and so forth. As also shown, memory 130 includes, without limitation, an interactive virtual meeting assistant 132, which is a software application that, when executed by processor 120, causes processor 120 to execute an interactive virtual meeting assistant application. Interactive virtual meeting assistant 132 may include any technically feasible type of virtual meeting assistant, such as the EVA application from VOICERA, INC.

Dial-in infrastructure networks 140 may be any technically feasible network or set of interconnected communication links that enable interactive virtual meeting assistant 132, as executed by processor 120, to participate in a meeting with one or more meeting participants 150(0) to 150(m). In various embodiments, dial-in infrastructure networks 140 may include, without limitation, one or more telephone line connections or one or more computer connections, such as a local area network (LAN), wide area network (WAN), the World Wide Web, or the Internet, among others. Dial-in infrastructure networks 140 may also allow interactive virtual meeting assistant 132 to access other information via the networks, such as by accessing information via the World Wide Web, or the Internet, among others.

Meeting participants 150(0) to 150(m) represent one or more human and/or computer participants in a meeting environment. Each of meeting participants 150(0) to 150(m) may be connected to other meeting participants and interactive virtual meeting assistant 132, as executed by processor 120, via any technically feasible device that forms a connection to other meeting participants, such as a telephone, smartphone, computing device, or personal data assistant, among others. The connections linking meeting participants 150(0) to 150(m) may be any technically feasible communication link(s), including, without limitation, communication links in dial-in infrastructure networks 140 and/or external communication links such as telephone line connections and/or network connections to a local area network (LAN), wide area network (WAN), the World Wide Web, or the Internet, among others.

Although FIG. 1 shows interactive virtual meeting assistant 132 stored in memory 130 of computing device 110, in alternative embodiments, interactive virtual meeting assistant 132 may be stored in part or entirely in memory 130 and/or on any technically feasible memory device internal to or external to computing device 110, including any memory device coupled to computing device 110 through a wired connection, a wireless connection, a network connection, and so forth.

Interactive virtual meeting assistant 132 includes functionality to generate, track, and/or store metadata and recordings related to a meeting. For example, interactive virtual meeting assistant 132 may obtain a title, location (e.g., physical address, building number, conference room name, teleconferencing link, phone number, etc.), description, agenda, time, duration, list of participants, inviter or organizer, and/or other information describing the meeting from a calendar invitation, email, text message, chat message, voicemail, phone call, and/or other communication related to the meeting. Interactive virtual meeting assistant 132 may also, or instead, capture audio and/or video of the meeting; record notes or action items generated during the meeting; and/or generate a transcript from the audio and/or video recording of the meeting, as described in further detail below with respect to FIG. 2. Interactive virtual meeting assistant 132 may further record "highlights" that are flagged by one or more meeting participants 150(0) to 150(m) as important. A meeting participant may activate recording of a highlight by issuing a voice command and/or other type of input to interactive virtual meeting assistant 132.

Ensemble Modeling of Automatic Speech Recognition Output

Figure 2:
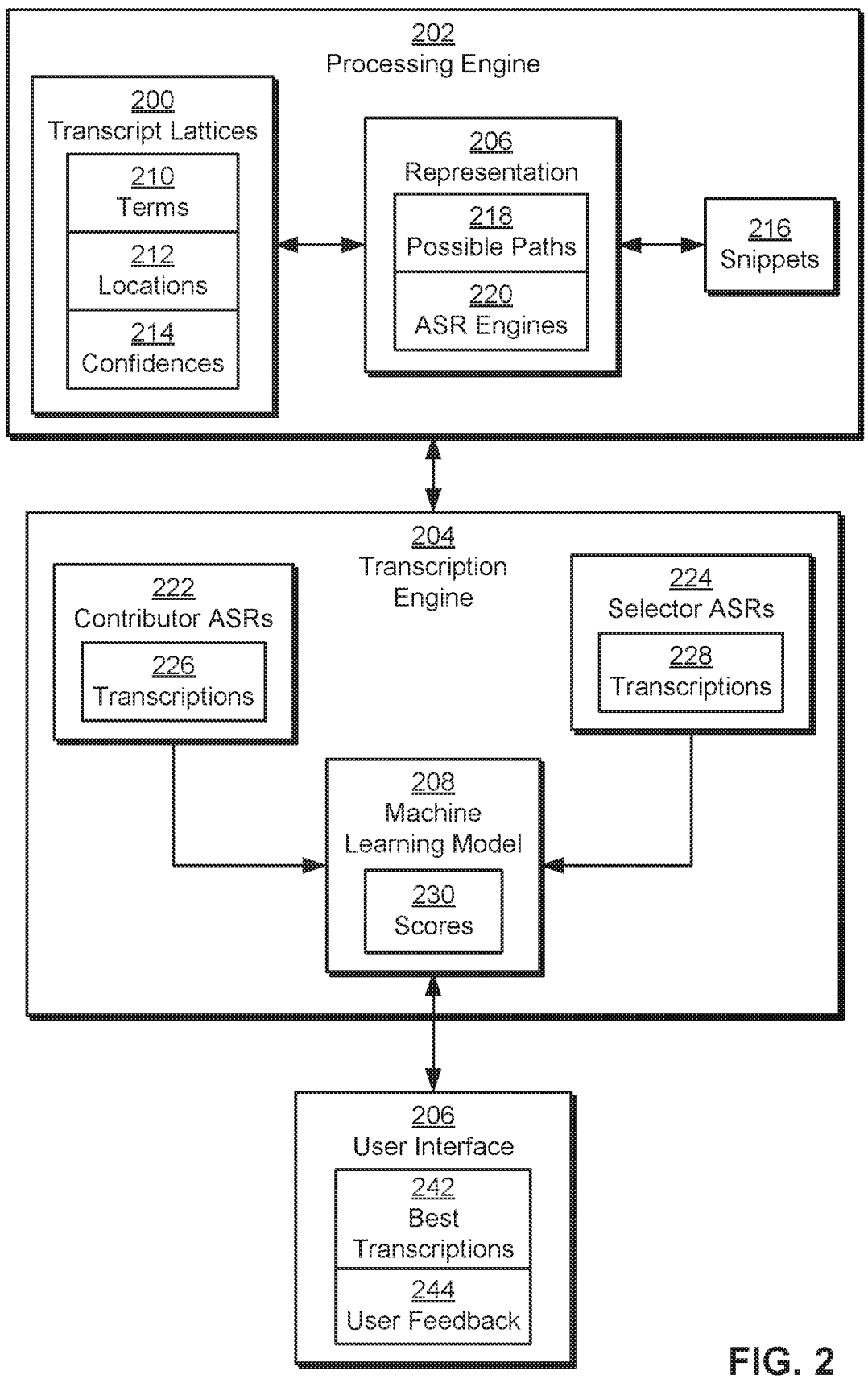
FIG. 2 is a more detailed illustration of functionality provided by the interactive virtual meeting assistant of FIG. 1, according to various embodiments of the present invention.

FIG. 2 is a more detailed illustration of functionality provided by interactive virtual meeting assistant 132 of FIG. 1, according to various embodiments of the present invention. As shown, the functionality may be provided by a processing engine 202 and a transcription engine 204, which can be implemented as part of and/or separately from interactive virtual meeting assistant 132. Each of these components is described in further detail below.

As mentioned above, interactive virtual meeting assistant 132 may include functionality to generate a transcript of a recording of a meeting (or any other type of activity or event). More specifically, interactive virtual meeting assistant 132 may use ensemble modeling of automatic speech recognition (ASR) output to assemble the transcript from multiple possible transcriptions 226-228 generated by a number of ASR engines 220 (individually referred to as an "ASR engine 220") from the recording. Each ASR engine 220 may utilize a different model and/or technique to transcribe the recording. As a result, ASR engines 220 may differ in performance based on languages, vocabularies, accents, dialects, voices, speech patterns, volume, noise, distortions, audio quality, and/or other conditions associated with or found in the recording.

Processing engine 202 may execute or otherwise use ASR engines 220 to generate transcriptions 226-228 of the recording. For example, processing engine 202 may execute ASR engines 220 to generate transcript lattices 200. Processing engine 202 may also, or instead, obtain one or more transcript lattices 200 from ASR engines 220 that execute independently from processing engine 202.

Each transcript lattice includes a set of terms 210, locations 212 of terms 212 in the recording, and confidences 214 in terms 210. Terms 210 may include words, phrases, morphemes, n-grams, syllables, phonemes, and/or other representations of speech or text that is extracted from the recording. When ASR techniques are used to generate non-word terms 210 (e.g., morphemes, phonemes, syllables, etc.) from the recording, the non-word terms may be converted into words. The words may then be included in the corresponding transcript lattices 200, in lieu of or in addition to the non-word terms used to produce the words.

Locations 212 may represent the positions of terms 210 in the recording. For example, each location may specify a start and end timestamp for each term, a start timestamp and a duration for each term, and/or another representation of the portion of the recording occupied by the term.

Confidences 214 may include measures of accuracy in terms 210 generated by the ASR techniques from the recording. For example, each confidence may be represented by a value with a range of 0 to 1, which represents the probability that a word predicted by the corresponding ASR engine exists at the corresponding location.

After terms 210, locations 212, and confidences 214 are generated in each transcript lattice, the transcript lattice may be represented as a Weighted Finite-State Transducer and/or other type of graph. Nodes in the graph may represent states, and edges in the graph may represent transitions between pairs of states. For example, each edge in a lattice may be represented using the following format:

<start state id><end state id><input symbol><output symbol><weight>

In the above representation, the edge connects two states represented by "start state id" and "end state id." The "input symbol" may represent an identifier for the edge, and the "output symbol" may represent an identifier for a word. The "weight" may encode one or more probabilities, duration, penalty, and/or other quantity that accumulates along one or more paths representing transcriptions of words, phrases and/or other units of speech in the recording.

In turn, processing engine 202 may combine terms 210, locations 212, and/or confidences 214 from transcript lattices 200 into a unified representation 206 of all transcriptions 226-228 produced by ASR engines 220 from the recording. Representation 206 may include all possible paths 218 formed by a graph of terms 210 in each transcript lattice, according to locations 212 of terms 210 in the transcript lattice. For example, a recording containing the phrase "hi there" may include the following possible paths 218 in representation 206:

hi there
hi the
high there
high the

In other words, each possible path in representation 206 may include a linear sequence of consecutive, non-overlapping terms 210 from a corresponding transcript lattice.

Processing engine 202 may also associate possible paths 218 in representation 206 with the corresponding ASR engines 220. For example, processing engine 202 may store, in representation 206, a mapping of each possible path to identifiers for one or more ASR engines used to produce the path.

Processing engine 202 further identifies portions of possible paths 218 that pertain to snippets 216 of voice activity in the recording. For example, processing engine 202 and/or another component may use a voice activity detection technique to identify snippets 216 as time intervals in the recording that contain voice activity. The voice activity detection technique may identify and/or filter noise in the recording and classify fixed-duration frames (e.g., one-second frames) of the remaining audio signal as containing or not containing speech. Snippets 216 may then be defined and/or represented as consecutive frames in the recording that are classified as containing speech.

Processing engine 202 and/or another component may also, or instead, divide intervals of voice activity in the recording into smaller snippets 216. For example, the component may divide a five- to seven-second interval of voice activity into snippets 216 of individual phonemes, syllables, words, and/or other representations of speech that can be produced and/or processed by ASR engines 220.

Processing engine 202 then identifies a set of possible transcriptions 226-228 of each snippet based on a subset of possible paths 218 spanned by the snippet. For example, processing engine 202 may identify transcriptions 226-228 of a snippet as linear sequences of terms 210 in possible paths 218 that are contained within the time interval spanned by the snippet. Each possible path may include words, phrases, and/or other units of speech from one or more transcript lattices 200 and/or ASR engines 220. In other words, a given possible path may be composed of a sequence of multiple sub-lattices from multiple ASR engines 220.

After possible transcriptions 226-228 for snippets 216 are identified, transcription engine 204 may select a best transcription (e.g., best transcriptions 242) of each snippet from the set of possible transcriptions 226-228. In particular, transcription engine 204 may divide ASR engines 220 into a set of contributor ASRs 222 and a different set of selector ASRs 224. Contributor ASRs 222 may represent ASR engines 220 that are used to generate best transcriptions 242 of snippets 216, and selector ASRs 224 may represent ASR engines 220 that produce transcriptions 228 for use in assessing the correctness or accuracy of transcriptions 226 from contributor ASRs 222.

Transcription engine 204 may use a number of criteria to select contributor ASRs 222 and selector ASRs 224 from the available ASR engines 220. For example, transcription engine 204 may identify contributor ASRs 222 as a certain number of ASR engines 220 with the best historical performance or accuracy in transcribing recordings and selector ASRs 224 as remaining ASR engines 220 that are not selected as contributor ASRs 222. In another example, transcription engine 204 may select contributor ASRs 222 as ASR engines 220 with the best performance in generating transcripts under certain conditions associated with the recording (e.g., languages, dialects, accents, voices, speech patterns, noise characteristics, distortion, volume, audio quality, etc.). The conditions may be determined by analyzing the recording and/or metadata associated with the recording (e.g., metadata for a meeting captured in the recording).

Next, transcription engine 204 may input transcriptions 226-228 into a machine learning model 208. For example, machine learning model 208 may be an artificial neural network (ANN) and/or other type of model that accepts, as input, one transcription of a snippet from a contributor ASR and additional transcriptions 228 of the snippet from selector ASRs 224.

Input to the ANN may also, or instead, include features related to the corresponding transcriptions from the contributor ASR and selector ASRs 224. For example, the features may include the number of words in each transcription, a difference in the number of words in the transcription from the contributor ASR and the number of words in the transcription from each selector ASR, a pairwise word agreement or disagreement rate between the transcription from the contributor ASR and the transcription from each selector ASR, and/or the confidence of each ASR in the corresponding transcription.

For each inputted set of transcriptions 226-228 and/or associated features, machine learning model 208 may generate a score (e.g., scores 230) reflecting the accuracy or correctness of the transcription from the contributor ASR, based on the corresponding transcriptions 228 and/or distribution of transcriptions 228 produced by selector ASRs 224. For example, machine learning model 208 may produce a score that represents an estimate of the overall or cumulative error rate between the transcription from the contributor ASR and the corresponding collection of transcriptions 228 produced by selector ASRs 224. During calculation of the score, machine learning model 208 may apply different weights to certain transcriptions 228 and/or portions of one or more transcriptions 226-228 (e.g., words of different lengths, words at the beginning or end of each transcription, etc.). As a result, machine learning model 208 may use transcriptions 228 from selector ASRs 224 as "votes" regarding the correctness or accuracy of a transcription from a given contributor ASR.

More specifically, transcription engine 204 may input each transcription of a snippet from contributor ASRs 222 and the corresponding set of transcriptions 228 of the snippet from selector ASRs 224 into machine learning model 208 to generate a different score for the transcription from contributor ASRs 222. Transcription engine 204 may then compare scores 230 for all transcriptions 226 of the snippet from contributor ASRs 222 to select the best transcription of the snippet. For example, transcription engine 204 may sort transcriptions 226 by scores 230 and select the transcription with the best or highest score (e.g., similarity to the corresponding collection of transcriptions 228, accuracy, correctness, etc.) as the best transcription of the snippet.

After best transcriptions 242 are selected and/or identified for all snippets 216 of voice activity in the recording, transcription engine 204 and/or another component may generate a transcript of the recording from best transcriptions 242. For example, the component may order best transcriptions 242 by the positions of the corresponding snippets 216 within the transcript.

The component may also display and/or output the transcript and/or individual best transcriptions 242 in a user interface 206 that is provided by interactive virtual meeting assistant 132 and/or separately from interactive virtual meeting assistant 132. For example, user interface 206 may include a graphical user interface (GUI), web-based user interface, voice user interface, and/or other type of interface between a human and an electronic device. Within user interface 206, best transcriptions 242 may be displayed and/or otherwise outputted to one or more users, such as an organizer, inviter, and/or attendee of the meeting or event captured by the recording; a user that is interested in the content or discussion of the meeting or event; and/or a user that is responsible for assessing the outcome of the meeting or event.

The user(s) may also interact with user interface 206 to provide user feedback 244 related to the transcript and/or one or more best transcriptions 242. For example, each user may interact with one or more user-interface elements to confirm the correctness or accuracy of a best transcription of a snippet; select an alternative transcription of the snippet that is more accurate (e.g., a transcription from a different ASR engine); and/or manually input a correct transcription of the snippet.

In turn, transcription engine 204 and/or another component may update machine learning model 208 based on user feedback 244. For example, the component may obtain human transcriptions of one or more snippets 216 from user feedback 244 and use differences between the human transcriptions and the corresponding best transcriptions 242 selected by machine learning model 208 to retrain parameters (e.g., coefficients, weights, etc.) of machine learning model 208. Such retraining may occur in an online, offline, and/or nearline basis to accommodate requirements or limitations associated with the performance or scalability of the system and/or the availability of best transcriptions 242 and/or the corresponding user feedback 244.

After machine learning model 208 is updated, transcription engine 204 may use the updated machine learning model 208 to select best transcriptions 242 of snippets 216 in subsequent recordings from transcript lattices 200 generated by ASR engines 220 from the recordings. Transcription engine 204 may also update lists of contributor ASRs 222 and/or selector ASRs 224 based on the recent performances of ASR engines 220 in generating the transcriptions from snippets 216 in the recordings. As the functionality of machine learning model 208 and/or transcription engine 204 is updated to reflect user feedback 244, the accuracy of transcripts and/or best transcriptions 242 of snippets 216 produced by machine learning model 208 and/or transcription engine 204 may improve over time.

Figure 3:
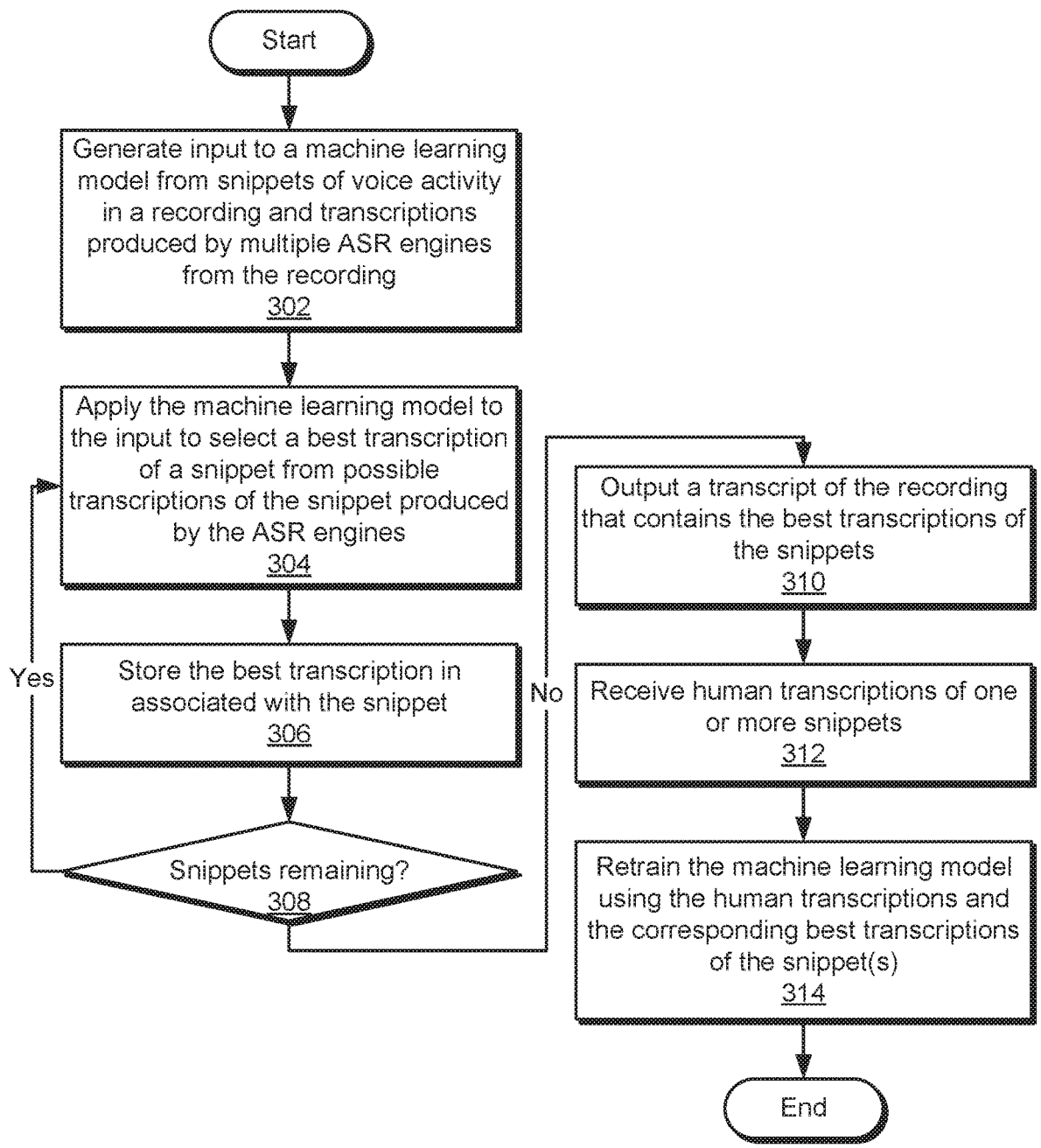
FIG. 3 is a flow diagram of method steps for performing ensemble modeling of automatic speech recognition (ASR) output, according to various embodiments of the present invention.

FIG. 3 is a flow diagram of method steps for performing ensemble modeling of automatic speech recognition (ASR) output, according to various embodiments of the present invention. Although the method steps are described in conjunction with the systems of FIGS. 1-2, persons skilled in the art will understand that any system configured to perform the method steps, in any order, is within the scope of the present invention.

As shown, processing engine 202 generates 302 input to a machine learning model from snippets of voice activity in a recording and transcriptions produced by multiple ASR engines from the recording. Details of operation 302 are described in further detail below with respect to FIG. 4. Next, transcription engine 204 applies 304 a machine learning model to the input to select a best transcription of a snippet from possible transcriptions of the snippet produced by the ASR engines. Details of operation 304 are described in further detail below with respect to FIG. 5.

Transcription engine 204 then stores 306 the best transcription in association with the snippet. For example, transcription engine 204 may store a mapping of an identifier for the snippet (e.g., a numeric identifier, a range of times or frames spanned by the snippet, etc.) to the best transcription of the snippet in a file, document, memory location, database, data structure, and/or another data storage mechanism.

Transcription engine 204 may repeat 308 operations 304-306 for remaining snippets of voice activity in the recording. After best transcriptions are identified for all snippets of voice activity in the recording, transcription engine 204 outputs 310 a transcript of the recording that contains the best transcriptions of the snippets. For example, transcription engine 204 may populate the transcript with the best transcriptions, ordered by the positions of the corresponding snippets in the recording. Transcription engine 204 may then store the transcript and/or display or transmit the transcript to one or more users.

After one or more portions of the transcript are outputted, transcription engine 204 receives 312 human transcriptions of one or more snippets. For example, transcription engine 204 may use user interface 206 and/or another mechanism to obtain user feedback containing human, "ground truth" transcriptions of snippets in the recording.

Finally, transcription engine 204 and/or another component retrains 314 the machine learning model using the human transcriptions and the corresponding best transcriptions of the snippet(s) from the machine learning model. For example, the component may use differences between the human transcriptions and the corresponding best transcriptions to retrain parameters (e.g., coefficients, weights, etc.) of the machine learning model, thereby improving the performance of the machine learning model over time.

Figure 4:
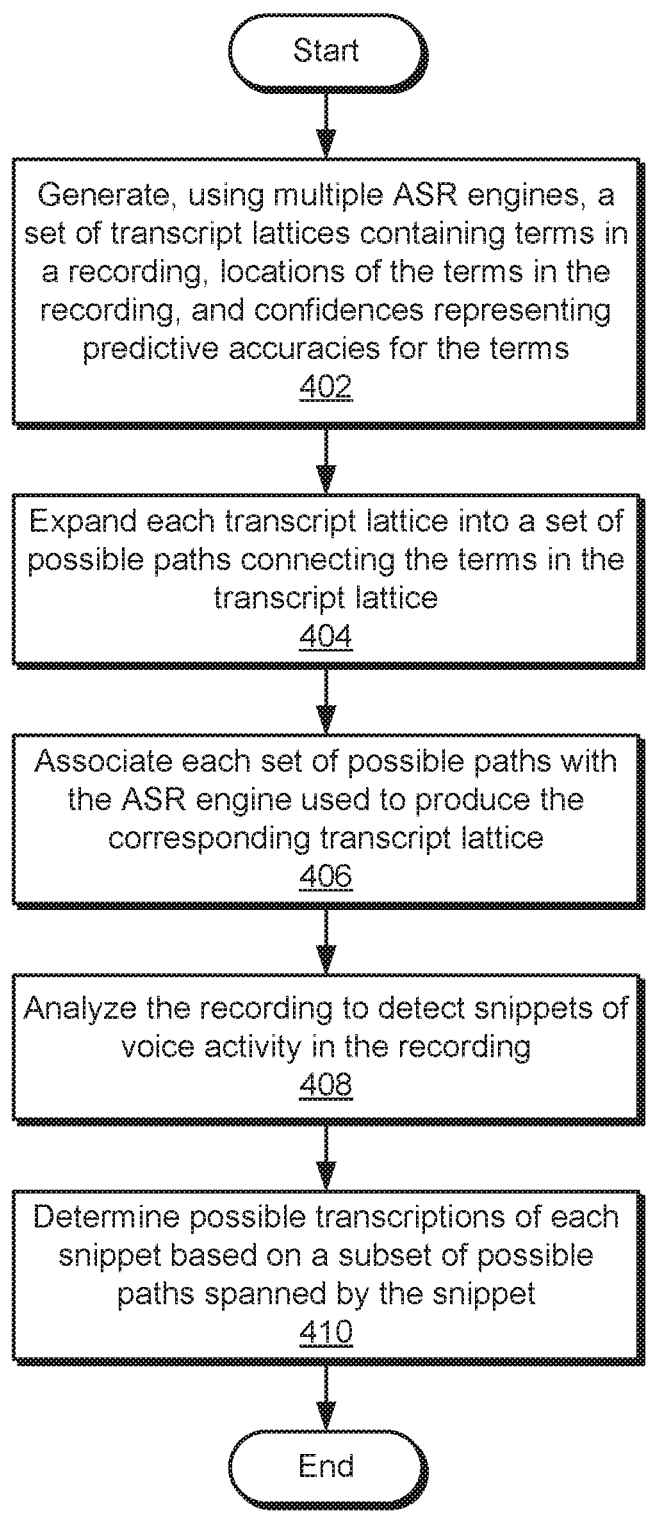
FIG. 4 is a flow diagram of method steps for generating input that is used to perform the ensemble modeling of FIG. 3, according to various embodiments of the present invention.

FIG. 4 is a flow diagram of method steps for generating input that is used to perform the ensemble modeling of FIG. 3, according to various embodiments of the present invention. Although the method steps are described in conjunction with the systems of FIGS. 1-2, persons skilled in the art will understand that any system configured to perform the method steps, in any order, is within the scope of the present invention.

As shown, processing engine 202 generates 402, using multiple ASR engines, a set of transcript lattices containing graphs of terms in a recording, locations of the terms in the recording, and confidences representing predictive accuracies of the terms. For example, each transcript lattice may be produced by a different ASR engine from the recording. Entries or lines in the transcript lattice may include a start timestamp, an end timestamp or duration, a word spanning the start and end timestamps (or the duration after the start timestamp), and/or a confidence score for the word that ranges from 0 to 1. A graph of the terms may then be formed by connecting adjacent, non-overlapping words in the transcript lattice with directed edges.

Next, processing engine 202 expands 404 each transcript lattice into a set of possible paths connecting the terms in the transcript lattice. For example, processing engine 202 may use the graph to generate all possible paths connecting the first terms identified in the recording (and/or a portion of the recording) and the last terms identified in the recording (and/or a portion of the recording).

Processing engine 202 also associates 406 each set of possible paths with the ASR engine used to produce the corresponding transcript lattice. For example, processing engine may store a mapping of each path produced from terms in a transcript lattice to an identifier for the ASR engine that generated the transcript lattice.

Processing engine 202 then analyzes 408 the recording to detect snippets of voice activity in the recording. For example, processing engine 202 may use a voice activity detection technique to classify individual frames in the recording as containing or not containing voice activity. Processing engine 202 may then obtain the snippets as consecutive frames in the recording that are classified as containing speech and/or one or more frames containing individual phonemes, syllables, words, phrases, and/or other units of speech in the recording.

Finally, processing engine 202 determines 410 possible transcriptions of each snippet based on a subset of possible paths spanned by the snippet. For example, processing engine 202 may identify transcriptions of each snippet as linear sequences of terms in the possible paths that are contained within the time interval spanned by the snippet.

Figure 5:
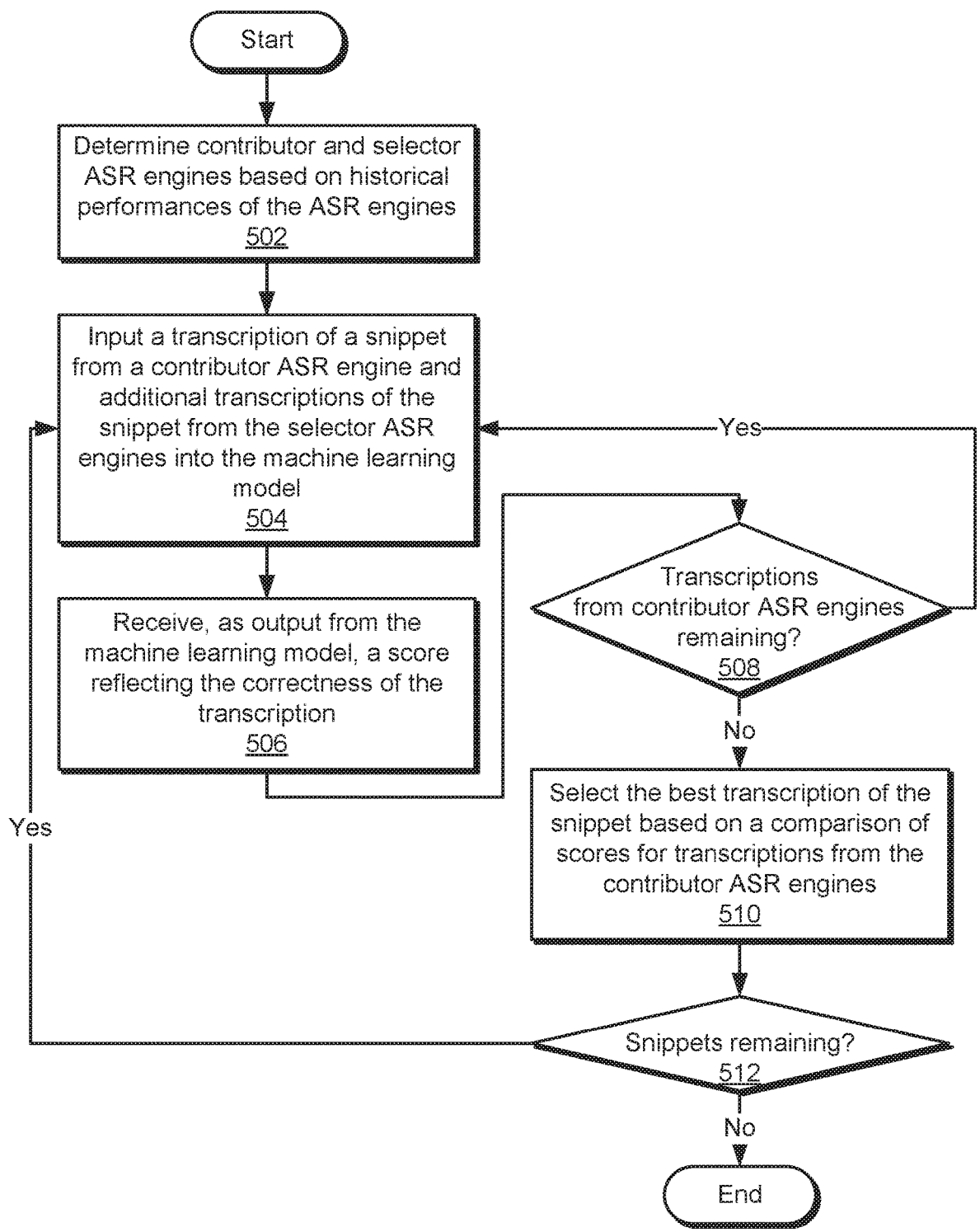
FIG. 5 is a flow diagram of method steps for applying a machine learning model to the input to generate a transcript of a recording, according to various embodiments of the present invention.

FIG. 5 is a flow diagram of method steps for applying a machine learning model to the input to generate a transcript of a recording, according to various embodiments of the present invention. Although the method steps are described in conjunction with the systems of FIGS. 1-2, persons skilled in the art will understand that any system configured to perform the method steps, in any order, is within the scope of the present invention.

As shown, transcription engine 204 determines 502 contributor and selector ASR engines based on historical performances of the ASR engines. For example, transcription engine 204 may select a certain number of ASR engines with the best historical performance in transcribing recordings as the contributor engines and the all remaining ASR engines as selector ASR engines. Transcription engine 204 may also, or instead, select the contributor and/or selector ASR engines based on conditions associated with the recording and/or individual snippets in the recording. For example, transcription engine 204 may select the contributor engines as ASR engines that have historically performed well with respect to a language, vocabulary, dialect, accent, voice, speech pattern, noise characteristic, distortion characteristic, and/or audio quality found in some or all of the recording.

Next, transcription engine 204 inputs 504 a transcription of a snippet from a contributor ASR engine and additional transcriptions of the snippet from the selector ASR engines into the machine learning model and receives 506 a score reflecting the correctness of the transcription as output from the machine learning model. For example, transcription engine 204 may input the transcriptions and/or additional features associated with the transcriptions into an ANN, and the ANN may output a score representing an estimate of the cumulative or overall similarity (or distance) between the transcription from the contributor ASR engine and the corresponding collection of transcriptions from the selector ASR engines.

Transcription engine 204 repeats 508 operations 504-506 for remaining transcriptions of the snippet from the contributor ASR engines. As a result, transcription engine 204 may use the machine learning model to obtain a different score for each transcription of the snippet produced by a contributor ASR engine.

Transcription engine 204 then selects 510 the best transcription of the snippet based on a comparison of scores for the transcriptions from the contributor ASR engines. For example, transcription engine 204 may select the best transcription as the transcription with the score that represents the highest overall similarity to the set of transcriptions from the selector ASR engines.

Transcription engine 204 may continue to select 512 best transcriptions of remaining snippets of voice activity in the recording. For each snippet, transcription engine 204 generates 504-508 scores for all transcriptions of the snippet from the contributor ASR engines and selects 510 the best transcription of the snippet based on a comparison of the scores. After the best transcriptions of all snippets have been selected, transcription engine 204 may store the best transcriptions in association with the corresponding snippets and/or use the best transcriptions to produce a transcript of the recording, as discussed above.

In sum, the disclosed techniques can be used to generate a transcript of a recording of a meeting or other event. To generate the transcript, different possible transcriptions of voice activity in the recording are obtained from multiple ASR engines, and a machine learning model is used to select the best transcription of each snippet of voice activity based on the level of consensus among the ASR engines in their transcriptions of the snippet. The transcript is then populated with the best transcriptions of all snippets of voice activity identified in the recording.

By using multiple ASR engines to produce multiple possible transcriptions of a recording and creating a transcript of the recording from the most accurate transcriptions of individual voice snippets in the recording, the disclosed techniques may produce a more accurate transcript of the recording than any transcript produced by an individual ASR engine. On the other hand, conventional techniques typically select and/or use a single ASR engine to produce a transcription of an entire recording and thus cannot adapt to changing conditions within the recording and/or across different recordings. Consequently, the disclosed techniques provide technological improvements in the accuracy and/or performance of ASR engines, interactive virtual meeting assistants, and/or other applications or devices that are used to manage, review, and/or analyze recordings of meetings or other types of events.

1. In some embodiments, a method comprises generating input to a machine learning model from snippets of voice activity in the recording and transcriptions produced by multiple automatic speech recognition (ASR) engines from the recording, and, for each snippet in the snippets: applying the machine learning model to the input to select, based on transcriptions of the snippet produced by at least one contributor ASR engine of the multiple ASR engines and at least one selector ASR engine of the multiple ASR engines, a best transcription of the snippet from possible transcriptions of the snippet produced by the multiple ASR engines, and storing the best transcription in association with the snippet.

2. The method of clause 1, wherein applying the machine learning model comprises measuring an accuracy of a first transcription of the snippet produced by the at least contributor ASR engine based on a second transcription of the snippet produced by the at least one selector ASR engine.

3. The method of clause 1 or 2, wherein generating the input to the machine learning model comprises generating, by the multiple ASR engines, a set of transcript lattices, wherein each transcript lattice in the set of transcript lattices comprises terms included in the recording, locations of the terms in the recording, and confidences representing predictive accuracies for the terms, and expanding each of the transcript lattices into a set of possible paths connecting the terms.

4. The method of any of clauses 1-3, wherein generating the input to the machine learning model further comprises associating, in the input, the set of possible paths with an ASR engine used to produce a corresponding transcript lattice.

5. The method of any of clauses 1-4, where generating the input to the machine learning model further comprises analyzing the recording to detect the snippets of voice activity in the recording, and, for each snippet in the snippets, determining the possible transcriptions of the snippet based on a subset of the possible paths spanned by the snippet.

6. The method of any of clauses 1-5, wherein applying the machine learning model to the input to select the best transcription of the snippet from the possible transcriptions of the snippet comprises inputting, into the machine learning model, a first transcription of the snippet from a first contributor ASR engine and a set of additional transcriptions of the snippet from a set of selector ASR engines and receiving, as output from the machine learning model, a first score reflecting a correctness of the first transcription of the snippet.

7. The method of any of clauses 1-6, wherein applying the machine learning model to the input to select the best transcription of the snippet from the possible transcriptions of the snippet further comprises inputting, into the machine learning model, a second transcription of the snippet from a second contributor ASR engine and the set of additional transcriptions of the snippet from the set of selector ASR engines, receiving, as output from the machine learning model, a second score representing a correctness of the second transcription of the snippet, and selecting the best transcription of the snippet based on a comparison of the first and second scores.

8. The method of any of clauses 1-7, wherein applying the machine learning model to the input to select the best transcription of the snippet from the possible transcriptions of the snippet further comprises determining the first contributor ASR engine, the second contributor ASR engine, and the set of selector ASR engines from the multiple ASR engines based on historical performances of the multiple ASR engines.

9. The method of any of clauses 1-8, wherein applying the machine learning model to the input to select the best transcription of the snippet from the possible transcriptions of the snippet further comprises determining the first contributor ASR engine, the second contributor ASR engine, and the set of selector ASR engines from the multiple ASR engines based on conditions associated with the recording.

10. The method of any of clauses 1-9, wherein the conditions comprise at least one of a language, a vocabulary, a dialect, an accent, a voice, a speech pattern, a noise characteristic, a distortion characteristic, and an audio quality.

11. The method of any of clauses 1-10, further comprising receiving a human transcription of the snippet, and retraining the machine learning model using the human transcription and the best transcription.

12. The method of any of clauses 1-12, wherein the machine learning model comprises an artificial neural network.

13. In some embodiments, a non-transitory computer readable medium storing instructions that, when executed by a processor, cause the processor to perform the steps of generating input to a machine learning model from snippets of voice activity in the recording and transcriptions produced by multiple automatic speech recognition (ASR) engines from the recording, and, for each snippet in the snippets: applying the machine learning model to the input to select, based on transcriptions of the snippet produced by at least one contributor ASR engine of the multiple ASR engines and at least one selector ASR engine of the multiple ASR engines, a best transcription of the snippet from possible transcriptions of the snippet produced by the multiple ASR engines, and storing the best transcription in association with the snippet.

14. The non-transitory computer readable medium of clause 13, where generating the input to the machine learning model comprises generating, by the multiple ASR engines, a set of transcript lattices, where each transcript lattice in the set of transcript lattices comprises terms included in the recording, locations of the terms in the recording, and confidences representing predictive accuracies for the terms, and expanding each of the transcript lattices into a set of possible paths connecting the terms in a corresponding graph.

15. The non-transitory computer readable medium of clause 13 or 14, wherein generating the input to the machine learning model further comprises analyzing the recording to detect the snippets of voice activity in the recording, and, for each snippet in the snippets, determining the possible transcriptions of the snippet based on a subset of the possible paths spanned by the snippet.

16. The non-transitory computer readable medium of any of clauses 13-15, where applying the machine learning model to the input to select the best transcription of the snippet from the possible transcriptions of the snippet comprises inputting, into the machine learning model, a first transcription of the snippet from a first contributor ASR engine and a set of additional transcriptions of the snippet from a set of selector ASR engines and receiving, as output from the machine learning model, a first score reflecting a correctness of the first transcription of the snippet.

17. The non-transitory computer readable medium of any of clauses 13-16, where applying the machine learning model to the input to select the best transcription of the snippet from the possible transcriptions of the snippet further comprises inputting, into the machine learning model, a second transcription of the snippet from a second contributor ASR engine and the set of additional transcriptions of the snippet from the set of selector ASR engines, receiving, as output from the machine learning model, a second score representing a correctness of the second transcription of the snippet, and selecting the best transcription of the snippet based on a comparison of the first and second scores.

18. The non-transitory computer readable medium of any of clauses 13-17, where the steps further comprise receiving a human transcription of the snippet, and retraining the machine learning model using the human transcription and the best transcription.

19. The non-transitory computer readable medium of any of clauses 13-18, where the machine learning model comprises an artificial neural network.

20. In some embodiments, a system comprises a memory that stores instructions, and a processor that is coupled to the memory and, when executing the instructions, is configured to generate input to a machine learning model from snippets of voice activity in the recording and transcriptions produced by multiple automatic speech recognition (ASR) engines from the recording, and, for each snippet in the snippets apply the machine learning model to the input to select, based on transcriptions of the snippet produced by at least one contributor ASR engine of the multiple ASR engines and at least one selector ASR engine of the multiple ASR engines, a best transcription of the snippet from possible transcriptions of the snippet produced by the multiple ASR engines, and store the best transcription in association with the snippet.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for generating a transcription of a recording, comprising:
    generating an input to a machine learning model from snippets of voice activity in the recording and transcriptions produced by multiple automatic speech recognition (ASR) engines from the recording; and
    for each snippet in the snippets:
        determining contributor ASR engines and selector ASR engines from the multiple ASR engines, wherein determining the contributor ASR engines and the selector ASR engines from the multiple ASR engines comprises:
            determining a predetermined number of the multiple ASR engines having historical performance in generating transcriptions that is better than the historical performance of a remaining number of the multiple ASR engines under pre-determined conditions as the contributor ASR engines, the pre-determined conditions comprising a selected metadata associated with the recording, and
            determining the remaining number of the multiple ASR engines as the selector ASR engines;
        applying the machine learning model to the input to select, based on transcriptions of the snippet produced by at least one contributor ASR engine of the contributor ASR engines, one or more transcriptions generated by at least one contributor ASR engine of the snippet from possible transcriptions of the snippet produced by the multiple ASR engines;

measuring, using one or more transcriptions generated by the at least one selector ASR engine, an accuracy of the one or more transcriptions generated by the at least one contributor ASR engine, wherein the machine learning model is trained based on a first historical performance of the at least one selector ASR engine; and storing, based on the measured accuracy, one of the one or more transcriptions generated by the at least one contributor ASR engine as a best transcription in association with the snippet.

2. The method of claim 1, wherein generating the input to the machine learning model comprises:

generating, by the multiple ASR engines, a set of transcript lattices, wherein each transcript lattice in the set of transcript lattices comprises terms included in the recording, locations of the terms in the recording, and confidences representing predictive accuracies for the terms; and expanding each of the transcript lattices into a set of possible paths connecting the terms.

3. The method of claim 2, wherein generating the input to the machine learning model further comprises associating, in the input, the set of possible paths with an ASR engine used to produce a corresponding transcript lattice.

4. The method of claim 2, wherein generating the input to the machine learning model further comprises:

analyzing the recording to detect the snippets of voice activity in the recording; and for each snippet in the snippets, determining the possible transcriptions of the snippet based on a subset of the possible paths spanned by the snippet.

5. The method of claim 1, wherein applying the machine learning model to the input to select the best transcription of the snippet from the possible transcriptions of the snippet comprises:

inputting, into the machine learning model, a first transcription of the snippet from a first contributor ASR engine and a set of additional transcriptions of the snippet from a set of selector ASR engines; and receiving, as output from the machine learning model, a first score reflecting a correctness of the first transcription of the snippet.

6. The method of claim 5, wherein applying the machine learning model to the input to select the best transcription of the snippet from the possible transcriptions of the snippet further comprises:

inputting, into the machine learning model, a second transcription of the snippet from a second contributor ASR engine and the set of additional transcriptions of the snippet from the set of selector ASR engines;

receiving, as output from the machine learning model, a second score representing a correctness of the second transcription of the snippet; and selecting the best transcription of the snippet based on a comparison of the first and second scores.

7. The method of claim 6, wherein applying the machine learning model to the input to select the best transcription of the snippet from the possible transcriptions of the snippet further comprises:

determining the first contributor ASR engine, the second contributor ASR engine, and the set of selector ASR engines from the multiple ASR engines based on historical performances of the multiple ASR engines.

8. The method of claim 6, wherein applying the machine learning model to the input to select the best transcription of the snippet from the possible transcriptions of the snippet further comprises:

determining the first contributor ASR engine, the second contributor ASR engine, and the set of selector ASR engines from the multiple ASR engines based on conditions associated with the recording.

9. The method of claim 8, wherein the conditions comprise at least one of a language, a vocabulary, a dialect, an accent, a voice, a speech pattern, a noise characteristic, a distortion characteristic, and an audio quality.

10. The method of claim 1, further comprising:

receiving a human transcription of the snippet; and retraining the machine learning model using the human transcription and the best transcription.

11. The method of claim 1, wherein the machine learning model comprises an artificial neural network.

12. A non-transitory computer readable medium storing instructions that, when executed by a processor, cause the processor to perform the steps of:

generating input to a machine learning model from snippets of voice activity in the recording and transcriptions produced by multiple automatic speech recognition (ASR) engines from the recording;

determining contributor ASR engines and selector ASR engines from the multiple ASR engines, wherein determining the contributor ASR engines and the selector ASR engines from the multiple ASR engines comprises:

determining a predetermined fraction of the multiple ASR engines having historical performance in generating transcriptions that is better than the historical performance of a remaining number of the multiple ASR engines under pre-determined conditions as the contributor ASR engines, the pre-determined conditions comprising a selected metadata associated with the recording, and determining the remaining fraction of the multiple ASR engines as the selector ASR engines;

applying, for each snippet in the snippets, the machine learning model to the input to select, based on transcriptions of the snippet produced by at least one contributor ASR engine of the contributor ASR engines one or more transcriptions generated by at least one contributor ASR engines of the snippet from possible transcriptions of the snippet produced by the multiple ASR engines;

measuring, using the one or more transcriptions generated by the at least one selector ASR engine, an accuracy of one or more transcriptions generated by the at least one contributor ASR engine, wherein the machine learning model is trained based on a first historical performance of the at least one selector ASR engine; and storing, based on the measured accuracy, one of the one or more transcriptions generated by the at least one contributor ASR engine as a best transcription in association with the snippet.

13. The non-transitory computer readable medium of claim 12, wherein generating the input to the machine learning model comprises:

generating, by the multiple ASR engines, a set of transcript lattices, wherein each transcript lattice in the set of transcript lattices comprises terms included in the recording, locations of the terms in the recording, and confidences representing predictive accuracies for the terms; and expanding each of the transcript lattices into a set of possible paths connecting the terms in a corresponding graph.

14. The non-transitory computer readable medium of claim 12, wherein generating the input to the machine learning model further comprises:
   analyzing the recording to detect the snippets of voice activity in the recording; and
   for each snippet in the snippets, determining the possible transcriptions of the snippet based on a subset of the possible paths spanned by the snippet.

15. The non-transitory computer readable medium of claim 12, wherein applying the machine learning model to the input to select the one or more transcriptions generated by the at least one contributor ASR engines of the snippet from the possible transcriptions of the snippet comprises:
   inputting, into the machine learning model, a first transcription of the snippet from a first contributor ASR engine and a set of additional transcriptions of the snippet from a set of selector ASR engines; and
   receiving, as output from the machine learning model, a first score reflecting a correctness of the first transcription of the snippet.

16. The non-transitory computer readable medium of claim 15, wherein applying the machine learning model to the input to select the one or more transcriptions generated by the at least one contributor ASR engines of the snippet from the possible transcriptions of the snippet further comprises:
   inputting, into the machine learning model, a second transcription of the snippet from a second contributor ASR engine and the set of additional transcriptions of the snippet from the set of selector ASR engines;
   receiving, as output from the machine learning model, a second score representing a correctness of the second transcription of the snippet; and
   selecting the one or more transcriptions generated by the at least one contributor ASR engines of the snippet based on a comparison of the first and second scores.

17. The non-transitory computer readable medium of claim 13, wherein the steps further comprise:
   receiving a human transcription of the snippet; and
   retraining the machine learning model using the human transcription and the best transcription.

18. The non-transitory computer readable medium of claim 13, wherein the machine learning model comprises an artificial neural network.

19. A system, comprising:
   a memory that stores instructions, and
   a processor that is coupled to the memory and, when executing the instructions, is configured to:
      generate an input to a machine learning model from snippets of voice activity in a recording and transcriptions produced by multiple automatic speech recognition (ASR) engines from the recording;
      determine contributor ASR engines and selector ASR engines from the multiple ASR engines, wherein the processor being operative to determine the contributor ASR engines and the selector ASR engines from the multiple ASR engines comprises the processor being operative to:
         determine a predetermined fraction of the multiple ASR engines as the contributor ASR engines having historical performance in generating transcriptions that is better than the historical performance of a remaining number of the multiple ASR engines under pre-determined conditions as the contributor ASR engines, the pre-determined conditions comprising a selected metadata associated with the recording, and
         determine the remaining fraction of the multiple ASR engines as the selector ASR engines; and
      for each snippet in the snippets:
         apply the machine learning model to the input to select, based on transcriptions of the snippet produced by at least one contributor ASR engine of the contributor ASR engines, one or more transcriptions generated by at least one contributor ASR engine of the snippet from possible transcriptions of the snippet produced by the multiple ASR engines;
         measure, using one or more transcriptions generated by the at least one selector ASR engine, an accuracy of the one or more transcriptions generated by the at least one contributor ASR engine, wherein the machine learning model is trained based on a first historical performance of the at least one selector ASR engine; and
         store, based on the measured accuracy, one of the one or more transcriptions generated by the at least one contributor ASR engine as a best transcription in association with the snippet.

* * * * *